(12) United States Patent
Johnston et al.

(10) Patent No.: US 8,819,819 B1
(45) Date of Patent: *Aug. 26, 2014

(54) METHOD AND SYSTEM FOR AUTOMATICALLY OBTAINING WEBPAGE CONTENT IN THE PRESENCE OF JAVASCRIPT

(75) Inventors: Nicholas Johnston, Cheltenham (GB); Graham Coomer, Gloucester (GB)

(73) Assignee: Symantec Corporation, Mountain View, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/454,725

(22) Filed: Apr. 24, 2012

Related U.S. Application Data

(63) Continuation-in-part of application No. 13/083,935, filed on Apr. 11, 2011.

(51) Int. Cl.
*G06F 21/20* (2006.01)
*G06F 21/51* (2013.01)
*G06F 15/16* (2006.01)
*H04L 9/32* (2006.01)

(52) U.S. Cl.
USPC ............ 726/22; 726/12; 726/14; 726/23; 726/25; 709/206; 709/224; 709/238

(58) Field of Classification Search
CPC ... G06F 21/56; G06F 21/566; H04L 63/1408; H04L 63/1433
USPC ........... 726/22–25, 12, 14; 709/224, 206, 238
See application file for complete search history.

(56) References Cited

U.S. PATENT DOCUMENTS

| | | | |
|---|---|---|---|
| 7,343,626 B1 * | 3/2008 | Gallagher | 726/25 |
| 7,797,421 B1 * | 9/2010 | Scofield et al. | 709/224 |
| 7,886,352 B2 | 2/2011 | Pandrangi et al. | |
| 7,917,655 B1 | 3/2011 | Coomer et al. | |
| 8,051,465 B1 | 11/2011 | Martin et al. | |
| 8,255,572 B1 | 8/2012 | Coomer | |
| 8,353,035 B1 | 1/2013 | Coomer et al. | |
| 2005/0283519 A1 * | 12/2005 | Turgeman et al. | 709/206 |
| 2006/0224677 A1 * | 10/2006 | Ishikawa et al. | 709/206 |
| 2007/0016949 A1 * | 1/2007 | Dunagan et al. | 726/22 |
| 2007/0261112 A1 | 11/2007 | Todd et al. | |
| 2008/0250159 A1 | 10/2008 | Wang et al. | |
| 2008/0313728 A1 | 12/2008 | Pandrangi et al. | |

(Continued)

OTHER PUBLICATIONS

Kumar Chellapilla et al, A Taxonomy of JavaScript Redirection Spam, ACM, 2007.*

(Continued)

*Primary Examiner* — David Garcia Cervetti
*Assistant Examiner* — Shanto M Abedin
(74) *Attorney, Agent, or Firm* — Wilmer Cutler Pickering Hale and Dorr LLP

(57) ABSTRACT

JavaScript on webpages linked to by URLs in messages is identified and the JavaScript is extracted. The JavaScript is then subjected to a JavaScript execution and analysis process whereby the JavaScript is executed in the context of a simulated web browser. The behavior of the JavaScript is then analyzed to identify one or more of: any URLs to be redirected to; any further executable JavaScript; and any content dynamically written to the webpage. The results are then either recursed into or are recorded and used to aid in the identification of spam messages.

20 Claims, 4 Drawing Sheets

(56) References Cited

U.S. PATENT DOCUMENTS

| | | | |
|---|---|---|---|
| 2009/0037997 A1 | 2/2009 | Agbabian et al. | |
| 2011/0030060 A1* | 2/2011 | Kejriwal | 726/25 |
| 2011/0145435 A1 | 6/2011 | Bhatawdekar et al. | |
| 2011/0191849 A1* | 8/2011 | Jayaraman et al. | 726/23 |
| 2011/0218958 A1* | 9/2011 | Warshavsky et al. | 706/54 |
| 2012/0102545 A1* | 4/2012 | Carter et al. | 726/3 |
| 2012/0210011 A1 | 8/2012 | Liu et al. | |

OTHER PUBLICATIONS

Marissa Vicario, Spammers Abuse Free Hosting Sites with JavaScript Redirects, posted on behalf of Nicholas Johnston, form symantec.com, Dec. 2010.*

Ellen Messmer, Barracuda gobbles up SaaS security start-up Purewire, Network World, 2009.*

Barracuda Purewire Web Security Service Cloud-based content filtering and malware protection, Barracuda Networks Inc., 2010.*

Krishna B. Vangapandu et al, A measurement study of web redirections in the internet, 2008.*

Johnston et al., "Method and System for Automatically Obtaining Web Page Content in the Presence of Redirects," U.S. Appl. No. 13/083,935, filed Apr. 11, 2011.

Chellapilla et al., "A Taxonomy of JavaScript Redirection Spam," *AIRWeb '07*, May 8, 2007, 8 pages, ACM, Alberta, Canada.

Nichols et al., "Simple & basic form spam reduction: checking for Javascript?" *Stack Overflow*, Sep. 9, 2008, 3 pages [online]. Retrieved on Jul. 9, 2012 from URL: http://stackoverflow.com/questions/52359/simple-basic-form-spam-reduction-checking-for-javascript.

Ortner et al., "Redirect Back to the Space where the User Comes From," *Atlassian Forums*, Apr. 8, 2008, 3 pages [online]. Retrieved on Sep. 2, 2011 from URL: http://forums.atlassian.com/message.jspa?messageID=257280526.

Pradhan, "'Really cool Facebook revolving images' is a SPAM," *Terabug*, Nov. 23, 2010, 6 pages [online]. Retrieved on Jul. 9, 2012 from URL: http://www.terabug.com/facebook-revolving-images-is-a-spam/.

Ream, "ASP Response.Redirect Recursive Limit IIS7?" *Experts Exchange*, 1 page [online], Retrieved on Sep. 2, 2011 from URL: http://www.experts-exchange.com/Web_Development/Web_Languages-Standards/ASP/Q_25388628.html.

Richardson, "Google's Matt Cutts and JavaScript Redirects," *WebProNews*, Aug. 19, 2005, 5 pages [online]. Retrieved on Jul. 9, 2012 from URL: http://www.webpronews.com/googles-matt-cutts-and-javascript-redirects-2005-08.

Rozell, "No-Spam E-mail," *JavaScript Source*, May 16, 2002, 7 pages [online]. Retrieved on Jul. 9, 2012 from URL: http://www.javascriptsource.com/miscellaneous/no-spam-e-mail.html.

Slawski, "Microsoft on Javascript Redirection Spam," *SEO by the Sea*, Sep. 24, 2007, 3 pages [online]. Retrieved on Jul. 9, 2012 from URL: http://www.seobythesea.com/2007/09/microsoft-on-javascript-redirection-spam/.

Wang, "Web Spam Detection for Heritrix," 2008, 17 pages, Retrieved on Jul. 9, 2012 from URL: https://webarchive.jira.com/wiki/exportword?pageId=5484.

No author provided, "FlashGot Changelog," *FlashGot*, 23 pages [online]. Retrieved on Sep. 2, 2011 from URL: http://flashgot.net/changelog.

No author provided, "Javascript spam," *Staffblog*, 3 pages [online]. Retrieved on Jul. 9, 2012 from URL: http://blog.freenode.net/2010/01/javascript-spam/.

No author provided, "Redirecting Spambots," *Spam Links*, 2 pages [online]. Retrieved on Sep. 2, 2011 from URL: http://spamlinks.net/prevent-spambots-redirect.htm.

No author provided, "Stop Spammer Email Harvesters by Inserting Addresses with JavaScript or CSS," *Nadeau Software*, May 4, 2007, 7 pages [online]. Retrieved on Jul. 31, 2012 from URL: http://nadeausoftware.com/articles/2007/05/stop_spammer_email_harvesters_inserting_addresses_with_javascript_or_css.

No author provided, "URL Redirection," *Wikipedia*, 12 pages [online]. Retrieved on Sep. 2, 2011 from URL: http//en.wikipedia.org/wiki/URL_redirection..

* cited by examiner

METHOD AND SYSTEM FOR AUTOMATICALLY OBTAINING WEBPAGE CONTENT IN THE PRESENCE OF JAVASCRIPT

RELATED APPLICATIONS

This application is a continuation-in-part of U.S. patent application Ser. No. 13/083,935, filed Apr. 11, 2011, and entitled "Method and System for Automatically Obtaining Web Page Content in the Presence of Redirects", and naming Nicholas Johnston and Graham Coomer as inventors, which is incorporated herein by reference in its entirety.

BACKGROUND OF THE INVENTION

One major problem facing modern computing systems and communications systems is the prevalence of spam messages. Spam messages are a serious issue not only in e-mail systems, but also in Short Message Service (SMS), Instant Messaging (IM), and in virtually every other form of electronic communication.

One form of spam that has become more and more common is a spam message that includes a Uniform Resource Locator (URL) that, when activated, links, or redirects, to one or more websites that include unsolicited, malicious, unwanted, offensive, or nuisance content.

One method that could be used to determine if a message including a URL is potential spam, i.e., is "spammy", is to analyze the included URL by one or more URL analysis methods such as, but not limited to: analyzing various portions of the URL; activating the URL link to the associated webpage; and/or analyzing the contents of the webpage linked to by the URL. However the prevalence of URL shortening services, and other types of redirects, has significantly complicated traditional URL analysis, and in particular, has made accessing a webpage, and the content of a webpage, associated with a URL far more difficult.

URL shortening services typically provide users, including spammers, the ability to shorten the size, or number of characters, associated with a given URL by providing shortened URLs that map, or redirect, to the longer actual URL. URL shortening services are legitimately used to allow the URL to be included in text size limited communications, such as Twitter™. On the other hand, spammers can use URL shortening services to mask an actual spam URL, and associated webpage content, by having multiple shortened URLs created that redirect to the same actual URL and/or each other.

Spammers have recently begun to regularly use URL redirects, including URL shortening service related URL redirects. In fact, many spammers now routinely employ a deeply nested series of URL redirects of various types, to frustrate, and/or avoid, URL analysis and the retrieval of associated webpage content.

Currently, redirects, and particularly nested redirects make it difficult, if not impossible, to identify and block the spam because, using URL redirects, the spammy URL content can be hidden by way of a redirect shell game that prevents currently available link-following, and/or security systems from automatically accessing the actual URL efficiently in a reasonable amount of time. Therefore, simply attempting to retrieve the content at an included URL will no longer reliably yield webpage content for analysis.

To further complicate the situation, redirects used by a spammer can be one or more of many different types of redirects, such as, but not limited to: Hypertext Transfer Protocol (HTTP) redirects; Hypertext Markup Language (HTML) Meta redirects; and JavaScript redirects, and can include other issues such as tracking bugs, Document Object Model (DOM) manipulation, and incorrect HTTP response codes. In addition, the number of redirects that can be employed by spammers is effectively unlimited. Therefore, some spammers use multiple types of redirects, and/or a high number of redirects, to frustrate analysis. Consequently, it is not sufficient to simply have lists of sites/URLs for which redirects should be handled because there are too many sites, and too many different methods for redirection available to the spammer.

In order to effectively, and efficiently, perform URL analysis redirects must be recognized and a determination must be made as to which type of redirect is in use, so that the URL related content can be obtained by traversing as many redirects as possible. However, pitfalls associated with redirect loops such as, but not limited to: extremely long chains of redirects such as are used in some denial of service attacks and tar-pitting, i.e., very slow redirects, must also be avoided. Currently available link-following, and/or security, systems typically fail to meet these criteria.

Related to the problem of redirects is the issue of tracking bugs. Tracking bugs are typically small pieces of code or images that must be executed or retrieved in order to obtain the URL webpage content required. Although, in some cases it might be possible to retrieve content without retrieving the tracking bug, often this lack of retrieving the tracking bug is noted by the site's operator and will cause the connecting Internet Protocol (IP) address, i.e., the URL analysis system, to be banned at Domain Name System (DNS) level from all sites hosted on that system; thereby effectively blocking a current link-following, and/or security system from following the current URL and any other associated/hosted URLs.

Another associated issue is that of DOM manipulation. DOM is a cross-platform and language-independent convention for representing and interacting with objects in HTML, Extensible Hypertext Markup Language (XHTML), and Extensible Markup Language (XML) documents. Aspects of the DOM, such as its "Elements", may be addressed and manipulated within the syntax of the programming language in use. Using DOM an HTML webpage's content can be changed, or even populated, via JavaScript once the webpage is loaded. This can be an effective way for spammers to hide content using JavaScript since any new content or changes made by JavaScript on the page would only become apparent when inspecting the DOM after any JavaScript has been executed.

In addition, JavaScript in particular can raise several difficult issues that cannot be solved by current redirect identification and link following systems, or simply having lists of sites/URLs for which redirects should be handled. Use of JavaScript in webpages linked to from spam messages is increasing. In addition, the malicious use of JavaScript is evolving rapidly and spammers have realized that currently available naive anti-spam systems are largely powerless to detect it.

This is due, in part, to the fact that JavaScript itself is a rich and dynamic programming language which offers spammers an almost unlimited range of options when it comes to obfuscating code and making it otherwise hard to analyze. Consequently, simply retrieving the content of a linked to a URL is not, in and of itself, sufficient to reliably obtain webpage content because spammers have started making significant use of obfuscated JavaScript redirects, additional executable JavaScript, and/or hidden content that is added dynamically to redirect webpages when they are rendered to conceal their spamming payloads and/or redirect chains.

Given the increased use of these techniques in webpages linked to by spam, anti-spam redirect identification and link following systems that do not address this fact can be insufficient and vulnerable to these now commonplace JavaScript issues.

As discussed above, current link-following, and/or security systems are often unable to provide an efficient and reliable system for accessing, and analyzing the webpage content associated with URLs included in messages that are redirects, and/or include tracking bugs, and/or include DOM manipulation, and/or include JavaScript redirects, the addition of executable JavaScript, and content dynamically written to the redirect webpage. As a result, currently many URLs included in messages cannot be analyzed in a reasonable time to determine if a message is spam, i.e., if the included URL is spam related. Therefore, many of these nuisance, and at times harmful, messages and included URLs currently find their way to thousands of victims each year. Clearly this is a far from ideal situation for the victims, but it is also a problem for all users of message systems who currently must suffer with the delays, and false positives, and/or must be wary of all messages, even those of seemingly legitimate origin and intent.

SUMMARY

According to one embodiment, a method and system for automatically obtaining webpage content in the presence of redirects includes receiving an incoming message, such as, but not limited to: an e-mail; an SMS message; an IM; or any other form of electronic message. The received message is analyzed to determine if the message contains any URLs.

Any detected URLs are then extracted and sent to a URL analysis process. In the course of the URL analysis process, the URLs are analyzed by one or more URL analysis methods such as, but not limited to: analyzing portions of the URL activating the URL link to the associated webpage; or analyzing the contents of the webpage linked to by the URL. When the URL link to the associated webpage is activated, the HTTP response headers and content sent from a webpage server in response to the browser HTTP requests to activate the URL link are analyzed to determine if the response includes a redirect to a new, or destination URL, and associated webpage, i.e., to determine if the detected URLs result in redirects.

If the HTTP response indicates a redirect, a URL redirect analysis process is initiated. The URL redirect analysis process includes a set of redirect processing procedures that are selectively applied to the results of HTTP requests depending on the type of redirect encountered. Each redirect is automatically followed. For chains of redirects, the process is recursive, i.e., is repeated automatically for each redirect, from the beginning and as if the new (destination) URL is itself an initial URL. The URL redirect analysis process is repeated for each new URL as often as necessary, and/or up to a defined time limit or a defined limited number of iterations, to obtain the end destination webpage content.

When processing the results of an HTTP request, if the HTTP request response is determined to be a redirect, then the URL redirect analysis process determines the type of redirect involved, and/or if other issues are present such as, but not limited to: whether the redirect is an interstitial webpage redirect; whether the redirect is a Meta redirect; whether the redirect is a JavaScript redirect, includes any further JavaScript to execute, and/or includes content dynamically written to the redirect webpage; and/or whether the redirect is any other form of redirect, including pop-ups, window.location redirects, and DOM manipulation redirect loops; whether frames, including inline frames are involved; whether tracking bugs are present; and/or whether incorrectly used HTTP status codes are involved.

Any JavaScript on webpages linked to by URLs is identified and the JavaScript is extracted. The JavaScript is then subjected to a JavaScript execution and analysis process.

The JavaScript is executed by the JavaScript execution and analysis process in the context of a "simulated web browser". The behavior of the JavaScript is then analyzed by the JavaScript execution and analysis process to identify one or more of: any URLs to be redirected to; any further executable JavaScript; and any content dynamically written to the webpage.

The results of the JavaScript execution and analysis process are either recursed into, i.e., are themselves subjected application of the JavaScript execution and analysis process, or are recorded and used to aid in the identification of spam messages by the URL redirect analysis process.

As noted above, depending on the type of redirect, and/or issue detected, one or more redirect processing procedures are taken that are specific to the type of redirect, and/or issue detected in order to follow the redirect or redirects. In a single application of the URL redirect analysis process, multiple types of redirects, and issues in a single URL string, are addressed using the relevant redirect processing procedures specific to the types of redirects, and/or issues detected.

If at any point it is determined an original or new URL is not a redirect and provides access to the associated webpage, then the webpage, and/or webpage content, is accessed and analyzed.

If, based on the results of the URL redirect analysis process, and/or the results of any of the redirect processing procedures, a URL is identified as being spam or potential spam, then protective action is taken such as, but not limited to: transforming the status of the URL, and the message including the URL, to a status of spam or potential spam; and/or blocking the message including the URL, and/or all associated URLS; and/or adding the URL to a URL block list.

If the URL redirect analysis fails to provide access to the associated webpage, one or more further analysis actions are taken such as, but not limited to: checking on the hostname of the destination URL to see if it contains spam-related words or phrases, or follows any defined pattern, or specific format, known to be used by spammers; checking if the redirect domain exists in various URL block lists; and any other further analysis as discussed herein. If the further analysis actions reveal potential spam, one or more protective actions are taken as discussed herein. If the further analysis actions fail to yield any reliable results, no further action is taken.

Using the method and system for automatically obtaining webpage content in the presence of redirects, spam messages, and spam URLs included in spam messages, including those that include JavaScript and/or JavaScript redirects, can be efficiently and reliably identified even in the presence of multi-layered redirects, frames, JavaScript, DOM manipulation, tracking bugs, and incorrect HTTP status codes, and while avoiding pitfalls associated with redirect loops such as extremely long chains of redirects and tar-pitting.

In addition, multiple types of redirects, and issues in a single URL string, including JavaScript redirects, and/or those that include any further JavaScript to execute, and/or those that include content dynamically written to the redirect webpage, can be addressed using the relevant redirect processing procedures specific to the types of redirects, and/or issues detected. Consequently, far more spam messages can be identified and stopped than is possible using currently available methods and systems.

BRIEF DESCRIPTION OF THE DRAWINGS

Common reference numerals are used throughout the figures and the detailed description to indicate like elements.

DETAILED DESCRIPTION

Figure 1:
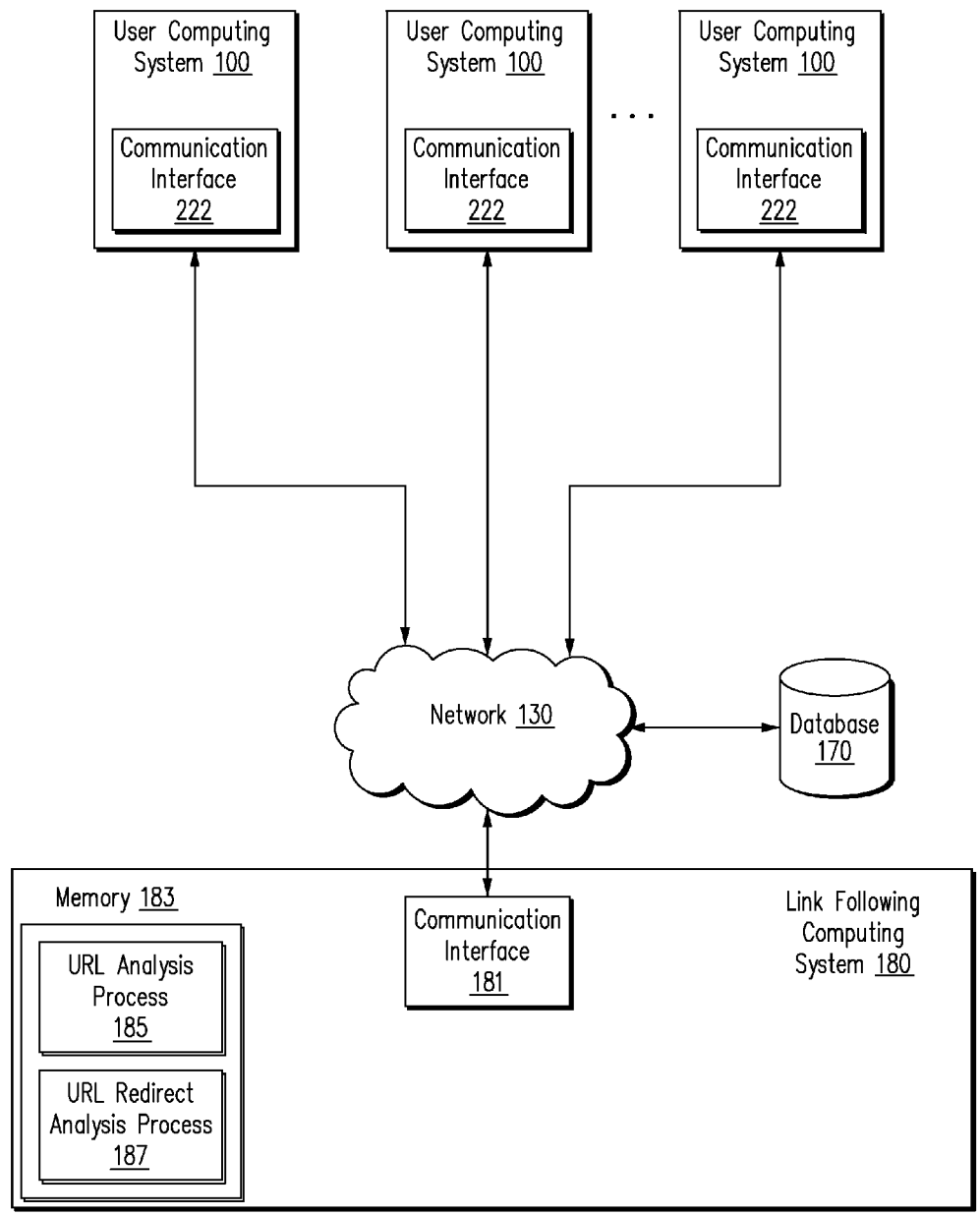
FIG. 1 is a block diagram of an exemplary hardware architecture including user computing systems, a network or cloud, a database, and a link following computing system, in accordance with one embodiment.

FIG. 1 shows a block diagram of an exemplary hardware system 10 suitable for automatically obtaining webpage content in the presence of redirects, such as exemplary process 300 of FIG. 3 discussed below. Exemplary hardware system 10 includes: one or more user computing system(s) 100, including communication interface(s) 222; link following computing system 180 including memory 183, communication interface 181, URL analysis process 185, and URL redirect analysis process 187; and database 170; all communicating via communication interfaces 222, 181, and network 130.

In one embodiment, one or more of user computing system(s) 100 are client computing systems and/or are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as link following computing system 180 or any one or more of other user computing system(s) 100.

As used herein, the term "computing system", such as is included in the terms "user computing system" and "link following computing system" includes, but is not limited to: a desktop computer; a portable computer; a workstation; a tablet computer; a notebook computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein, that includes components that can execute all, or part, of a process for automatically obtaining webpage content in the presence of redirects in accordance with at least one of the embodiments as described herein.

Exemplary hardware system 10 includes link following computing system 180. In one embodiment, link following computing system 180 is a server computing system that is, in turn, associated with one or more client computing systems, such as user computing system(s) 100. In one embodiment, link following computing system 180 is part of a cloud computing environment.

As discussed in more detail below, URL analysis process 185 is used to analyze all URLs detected in messages addressed to user computing system(s) 100 and URL redirect analysis process 187 is used to further analyze URLs that are determined at URL analysis process 185 to result in redirects.

Link following computing system 180, memory 183, URL analysis process 185, and URL redirect analysis process 187 are discussed in more detail below with respect to FIGS. 2 and 3.

In various embodiments, link following computing system 180 can be any computing system as defined herein, that includes components that can execute all, or part, of a process for automatically obtaining webpage content in the presence of redirects in accordance with at least one of the embodiments as described herein.

In some embodiments, all, or part, of the functions performed by link following computing system 180, memory 183, URL analysis process 185, and URL redirect analysis process 187, are implemented on, and/or performed by, user computing system(s) 100, or any other computing system as discussed herein.

Also shown in FIG. 1 is database 170. In one embodiment, database 170 is a data storage device, a designated server system or computing system, or a designated portion of one or more server systems or computing systems, such as computing system(s) 100, and/or link following computing system 180, or a distributed database, or an external and/or portable hard drive. In one embodiment, database 170 is a webpage server through which access to webpages is provided in response to the activation of URLs, such as URLs included in messages, and/or extracted from messages.

In one embodiment, database 170 is a dedicated mass storage device implemented in software, hardware, or a combination of hardware and software. In one embodiment, database 170 is a web-based function. As discussed in more detail below, database 170 is under the control of, or otherwise accessible by, a process for automatically obtaining webpage content in the presence of redirects, and/or a provider of a security system, and/or a link following computing system 180. In one embodiment, database 170 is part of a cloud computing environment.

In one embodiment, computing system(s) 100, link following computing system 180, and database 170, are coupled through network 130. Network 130 is any network, cloud, communications network, or network/communications network system such as, but not limited to: a peer-to-peer network; a hybrid peer-to-peer network; a Local Area Network (LAN); a Wide Area Network (WAN); a public network, such as the Internet; a private network; a cellular network; a combination of different network types; or other wireless, wired, and/or a wireless and wired combination network capable of allowing communication between two or more computing systems, as discussed herein.

In one embodiment, computing system(s) 100, link following computing system 180, and database 170, are coupled in a cloud computing environment.

Figure 2:
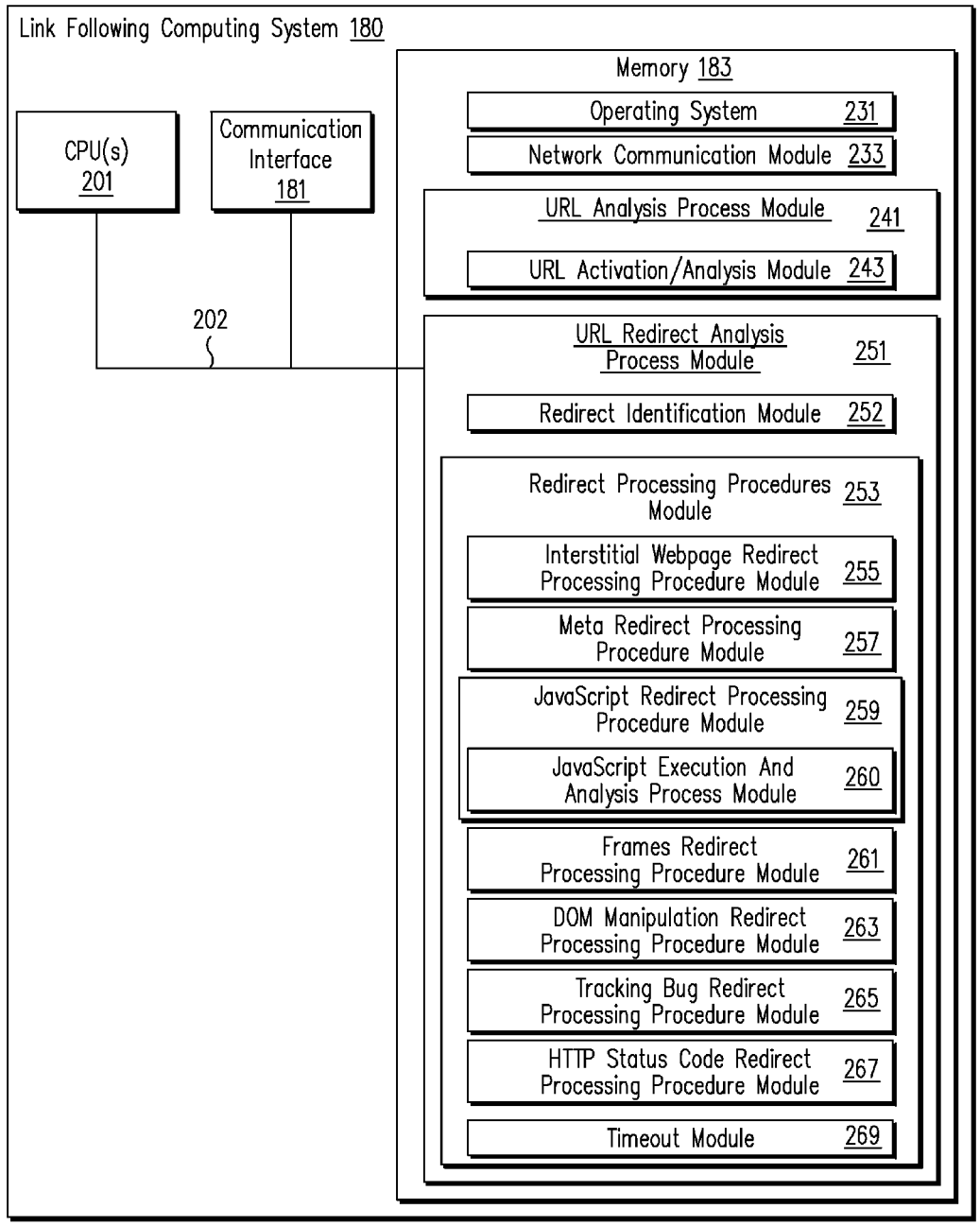
FIG. 2 is a block diagram of an exemplary link following computing system of FIG. 1 in accordance with one embodiment.

FIG. 2 is a more detailed block diagram of a link following computing system 180. As seen in FIG. 2, link following computing system 180 includes one or more Central Processing Unit(s), CPU(s) 201; memory 183; at least one communication interface 181; all interconnected by one or more communication buses 202.

As also seen in FIG. 2, in one embodiment, memory 183 can store data and/or instructions associated with, but not limited to, the following elements, subsets of elements, and/or super sets of elements for processing by one or more processors, such as CPU(s) 201: operating system 231 that includes procedures, data, and/or instructions for handling various services and performing/coordinating hardware dependent tasks; network communication module 233 that includes procedures, data, and/or instructions that, along with communication interface 181, connect link following computing system 180 to other computing systems, such as user computing system(s) 100, and/or a network, such as network 130 of FIG. 1, and/or a database, such as database 170 of FIG. 1; URL analysis process module 241 that includes procedures, data, and/or instructions, for implementing and operating a URL analysis process, such as URL analysis process 185 of FIG. 1; and URL redirect analysis process module 251 that includes procedures, data, and/or instructions, for implementing and operating a URL redirect analysis process, such as URL redirect analysis process 187 of FIG. 1.

URL analysis process module 241 of memory 183 includes URL activation/analysis module 243 that includes procedures, data, and/or instructions for analyzing extracted original URLs using one or more URL analysis methods such as, but not limited to: analyzing portions of the original URL; and/or activating the original URL link to the associated webpage; and/or analyzing the contents of the webpage linked to by the original URL and, when the original URL link to the associated webpage is activated, analyzing the HTTP response headers and content sent from a webpage server in response to the browser HTTP requests to activate an original URL link to determine if the response includes a redirect to a new or destination URL and associated webpage, i.e., to determine if the extracted original URLs result in redirects.

Memory 183 includes URL redirect analysis process module 251 that includes procedures, data, and/or instructions for, if the response is determined to be a redirect during the URL analysis process at URL analysis process module 241, initiating a URL redirect analysis process that includes a set of redirect processing procedures that are selectively applied by one or more processors associated with one or more computing systems to the results of HTTP requests depending on the type of redirect encountered. As part of the URL redirect analysis process, each redirect associated with an original URL is automatically followed. For loops or chains of redirects, the process is recursive, i.e., is repeated automatically for each redirect, from the beginning, and as if the new (destination) URL is itself an original URL. The URL redirect analysis process is repeated for each new URL as often as necessary, and/or up to a defined time limit, or a defined limited number of iterations, to obtain the end destination webpage content, as established and implemented by timeout module 269.

URL redirect analysis process module 251 further includes redirect identification module 252 that includes procedures, data, and/or instructions for determining the type of redirect involved, and/or if other issues are present, such as, but not limited to: whether the redirect is an interstitial webpage redirect; whether the redirect is a Meta redirect; whether the redirect is a JavaScript redirect; whether the redirect is any form of redirect loop; whether frames, including inline frames, are involved; whether tracking bugs are present; whether DOM manipulation is present; and/or whether incorrectly used HTTP status codes are involved.

URL redirect analysis process module 251 further includes redirect processing procedures module 253 that includes procedures, data, and/or instructions associated with one or more redirect processing procedures that are applied depending on the type of redirect(s), and/or issue(s), identified at redirect identification module 252 in order to follow the redirect, or redirects, through to the webpage content.

Redirect processing procedures module 253 of URL redirect analysis process module 251 includes interstitial webpage redirect processing procedure module 255 that includes procedures, data, and/or instructions for handling interstitial webpage redirects. The mere determination that the redirect is an interstitial webpage results in the status of the URL, and the message including the URL, being transformed to a status of spam under the direction of interstitial webpage redirect processing procedure module 255. Interstitial webpage redirects are further analyzed under the direction of interstitial webpage redirect processing procedure module 255, and the interstitial webpage redirects are matched with a combination of regular expressions (RE) per domain, and content analysis. In some cases, the interstitial webpage will indicate that the short link has been deleted but does not provide the destination URL. In configurable cases, this is taken by interstitial webpage redirect processing procedure module 255 as sufficient evidence to transform a status of the URL, and the message including the URL, to a status of spam.

Redirect processing procedures module 253 further includes Meta redirect processing procedure module 257 that includes procedures, data, and/or instructions for handling Meta redirects. Meta redirects are matched with a RE under the direction of Meta redirect processing procedure module 257.

Redirect processing procedures module 253 further includes JavaScript redirect processing procedure module 259 that includes procedures, data, and/or instructions for handling JavaScript redirects and JavaScript execution and analysis process module 260 that includes procedures, data, and/or instructions, for implementing a JavaScript execution and analysis process.

Any JavaScript contained within the webpages associated with a URL is identified, extracted, and further analyzed using JavaScript redirect processing procedure module 259 and JavaScript execution and analysis process module 260.

JavaScript execution and analysis process module 260 identifies and extracts JavaScript from between "SCRIPT" tags. JavaScript execution and analysis process module 260 identifies and extracts JavaScript from "on-event attributes" and/or handlers such as, but not limited to: on Body; on Load; on Change; on Focus; on Reset; on Select; on Submit; on Abort; on Unload; on Blur; and/or any other event attributes as discussed herein. In one embodiment, JavaScript execution and analysis process module 260 identifies and extracts JavaScript from URLs that begin "javascript:", and optionally from external JavaScript sources or files.

The JavaScript is encountered as separate portions of JavaScript, or "JavaScript fragments". The order in which each JavaScript fragment is encountered within the webpage content is maintained by JavaScript redirect processing procedure module 259 and JavaScript execution and analysis process module 260 to allow subsequent scripts to access and use the results of previous JavaScript fragments within the webpage.

Once JavaScript fragments have been identified by JavaScript execution and analysis process module 260, each fragment is executed in turn. This execution of JavaScript fragments by JavaScript execution and analysis process module

260 makes use of a shared JavaScript execution context that includes a DOM implementation similar to that contained in a normal web browser, i.e., a web browser is "simulated", at least at the network level. For instance, when doing an HTTP request, the User-Agent header is set appropriately in the request. JavaScript objects and associated properties to determine browser version from JavaScript code are made available. This is the extent to which the emulation of a particular browser is implemented, i.e., the extent to which a particular browser is "simulated". However, there is DOM support, which a normal web browser would provide.

In one embodiment, the web browser simulated by JavaScript execution and analysis process module 260 is a recent version of Internet Explorer™ and/or any web browser.

Following the execution of each JavaScript fragment by the web browser being simulated using JavaScript execution and analysis process module 260, the resulting DOM is examined by JavaScript execution and analysis process module 260 using an introspective method within the DOM implementation itself.

The web browser being simulated by JavaScript execution and analysis process module 260 looks for any redirect URLs that are, or include, dynamically written content. The web browser being simulated by JavaScript execution and analysis process module 260 then takes one of three actions depending on the result.

If the result of the JavaScript execution and analysis process is a URL, the URL is returned to the URL redirect analysis process and execution continues to allow further URLs and dynamically generated content to be extracted, as discussed below.

If the result of the JavaScript execution and analysis process itself contains JavaScript, this JavaScript is executed via recursion against the existing DOM as described above, i.e., this JavaScript is itself subjected to analysis using JavaScript redirect processing procedure module 259 and JavaScript execution and analysis process module 260 and execution continues to allow further URLs and dynamically generated content to be extracted.

If the result of the JavaScript execution and analysis process is pure HTML data, the HTML data is returned to the URL redirect analysis process for inclusion in a later HTML analysis of the webpage content as discussed below.

Once JavaScript redirect processing procedure module 259 and JavaScript execution and analysis process module 260 have completed the JavaScript execution, i.e., the JavaScript execution has concluded, the process for automatically obtaining webpage content in the presence of redirects, and the URL redirect analysis process itself, handles the result in one of two ways.

First, any URLs that were detected either from the JavaScript execution itself or those embedded in the resultant HTML by the JavaScript execution and analysis process are themselves link followed by the URL redirect analysis process, as discussed below.

Secondly, any dynamically written content that was detected by JavaScript redirect processing procedure module 259 and JavaScript execution and analysis process module 260 is appended to the original webpage content before the content analysis of this data occurs.

As discussed below, in one embodiment, the results of the JavaScript execution by JavaScript redirect processing procedure module 259 and JavaScript execution and analysis process module 260 are optionally cached to prevent spam runs from overrunning the JavaScript execution environment. Similarly the execution of JavaScript segments within webpages by JavaScript redirect processing procedure module 259 and JavaScript execution and analysis process module 260 is strictly time-limited by timeout module 269 to prevent denial of service attacks and to protect against devices such as infinite loops.

Redirect processing procedures module 253 includes frames redirect processing procedure module 261 that includes procedures, data, and/or instructions for handling frames. In one embodiment, frames are handled by defining/identifying a frameset and specifying a URL for each frame under the direction of frames redirect processing procedure module 261 and one or more processors associated with one or more computing systems. In one embodiment, a maximum number of frames per webpage eligible for analysis is defined. Any frames exceeding the maximum number are not analyzed by frames redirect processing procedure module 261. In one embodiment, each frame is recursed into following any additional redirects by the frame redirect processing procedure.

Redirect processing procedures module 253 includes DOM manipulation redirect processing procedure module 263 that includes procedures, data, and/or instructions for handling cases of DOM manipulation. Any JavaScript altering the webpage's DOM are analyzed under the direction of DOM manipulation redirect processing procedure module 263, to identify embedded content, which is often obfuscated, and also detect embedded URLs. The embedded URLs are treated by DOM manipulation redirect processing procedure module 263 in the same manner as frames are treated by frames redirect processing procedure module 261, i.e., each embedded URL is recursed into following any additional embedded URL/redirects.

Redirect processing procedures module 253 further includes tracking bug redirect processing procedure module 265 that includes procedures, data, and/or instructions for handling tracking bugs. Redirect identification module 252 determines if tracking bugs are present, and if present, the tracking bugs are retrieved by tracking bug redirect processing procedure module 265. In one embodiment, tracking bugs are intelligently detected using REs and content analysis under the direction of tracking bug redirect processing procedure module 265.

Redirect processing procedures module 253 further includes HTTP status code redirect processing procedure module 267 that includes procedures, data, and/or instructions for handling non-traditional, or incorrect, usage of HTTP status codes. Some servers return non-traditional, or incorrect, HTTP status codes, such as 404 for a deleted short link. Many current link-following, and/or security systems treat this as an error, and therefore end analysis and attempts to obtain web-page content. However, in configurable cases, when such an HTTP status code is received, the attached data indicating the reason for the HTTP status code is analyzed and, if the analysis indicates a non-traditional, or incorrect, HTTP status coding, that server's use of the HTTP status code is recorded and analysis is continued in both the current instance, and future instances.

Redirect processing procedures module 253 further includes timeout module 269 that includes procedures, data, and/or instructions for establishing, and enforcing, a timeout period, and/or timeout iteration count, limit. The timeout period, or timeout iteration count, can be any period, or count, desired by the provider of the process for automatically obtaining webpage content in the presence of redirects.

In various embodiments, any combination of the redirect processing procedures, and/or modules, as discussed herein, are used and/or employed by URL redirect analysis process module 251 and link following computing system 180.

A more detailed discussion of the operation of exemplary link following computing system 180 is provided below with respect to FIG. 3.

Process

As noted above, spam messages are prevalent and a serious issue not only in e-mail systems, but also in SMS, IM, and other text based, messaging systems, and in virtually every other form of electronic communication. Consequently, herein, the terms "message", "spam message", and "spam", include not only messages in e-mail systems, but also messages in SMS, IM, and other text based, messaging systems. In addition, herein, the terms "message", "spam message", and "spam" include attachments such as, but not limited to: PDF files; Word™ files, or other word processing documents/files; and/or any other document/file attachments.

Figure 3:
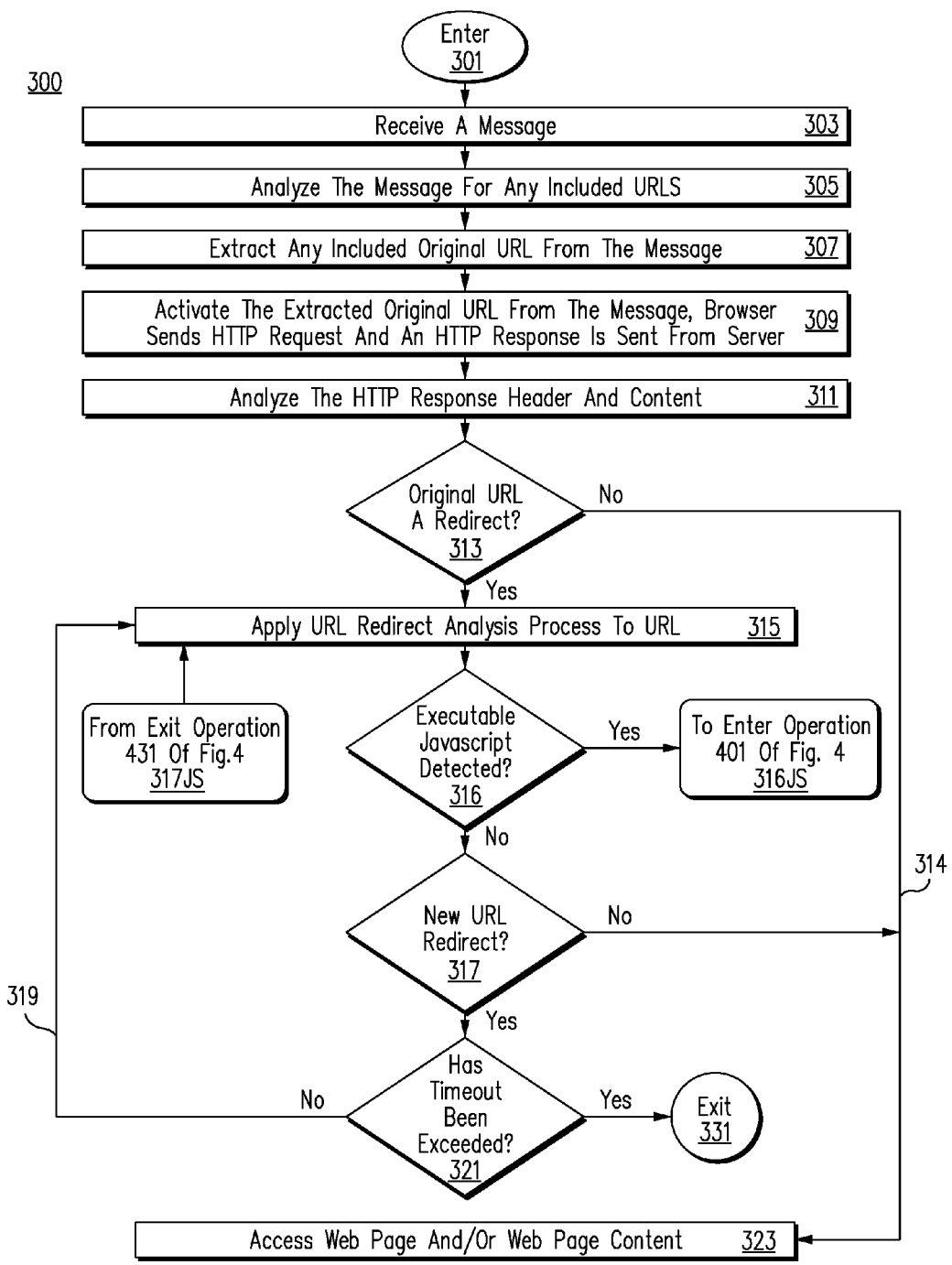
FIG. 3 is a flow chart depicting a process for automatically obtaining webpage content in the presence of redirects in accordance with one embodiment.

FIG. 3 is a flow chart depicting a process for automatically obtaining webpage content in the presence of redirects 300 in accordance with one embodiment.

Process for automatically obtaining webpage content in the presence of redirects 300 begins at ENTER OPERATION 301 of FIG. 3 and process flow proceeds to RECEIVE A MESSAGE OPERATION 303.

At RECEIVE A MESSAGE OPERATION 303, an incoming message is received. The received incoming message may be, but is not limited to, any of the following: an e-mail message; an SMS message; an IM; any text based message; and/or any other message, used in any message based system.

In one embodiment, the incoming message is addressed to a user computing system, such as user computing system(s) 100 of FIG. 1, and is received at a link following computing system, such as link following computing system 180 of FIGS. 1 and 2.

Once an incoming message is received at RECEIVE A MESSAGE OPERATION 303, process flow proceeds to ANALYZE THE MESSAGE FOR ANY INCLUDED URLS OPERATION 305.

At ANALYZE THE MESSAGE FOR ANY INCLUDED URLS OPERATION 305, the message is analyzed to determine if the message contains any URLs. Once the message is analyzed to determine if the message contains any URLs at ANALYZE THE MESSAGE FOR ANY INCLUDED URLS OPERATION 305, process flow proceeds to EXTRACT ANY INCLUDED ORIGINAL URL FROM THE MESSAGE OPERATION 307.

At EXTRACT ANY INCLUDED ORIGINAL URL FROM THE MESSAGE OPERATION 307, any URL included in the message is extracted and labeled an original URL. Various methods, means, mechanisms, processes, and procedures for extracting URLs from messages are known in the art, consequently, a more detailed discussion of specific methods, means, mechanisms, processes, and procedures for extracting URLs from messages is omitted here to avoid detracting from the invention.

Once any URL included in the message is extracted and labeled an original URL at EXTRACT ANY INCLUDED ORIGINAL URL FROM THE MESSAGE OPERATION 307, process flow proceeds to ACTIVATE THE EXTRACTED ORIGINAL URL FROM THE MESSAGE, BROWSER SENDS HTTP REQUEST AND AN HTTP RESPONSE IS SENT FROM SERVER OPERATION 309.

At ACTIVATE THE EXTRACTED ORIGINAL URL FROM THE MESSAGE, BROWSER SENDS HTTP REQUEST AND AN HTTP RESPONSE IS SENT FROM SERVER OPERATION 309, each extracted original URL is sent to a URL analysis process and the extracted original URLs are analyzed by one or more URL analysis methods such as, but not limited to: analyzing portions of the original URL; and/or activating the original URL link to the associated webpage; and/or analyzing the contents of the webpage linked to by the original URL.

At ACTIVATE THE EXTRACTED ORIGINAL URL FROM THE MESSAGE, BROWSER SENDS HTTP REQUEST AND AN HTTP RESPONSE IS SENT FROM SERVER OPERATION 309, each extracted original URL is activated.

For each extracted original URL that is activated, a response to the browser HTTP requests to activate the original URL link is generated that includes HTTP response headers and content sent from a webpage server.

Once each extracted original URL is activated at ACTIVATE THE EXTRACTED ORIGINAL URL FROM THE MESSAGE, BROWSER SENDS HTTP REQUEST AND AN HTTP RESPONSE IS SENT FROM SERVER OPERATION 309, process flow proceeds to ANALYZE THE HTTP RESPONSE HEADER AND CONTENT OPERATION 311.

At ANALYZE THE HTTP RESPONSE HEADER AND CONTENT OPERATION 311, the HTTP response headers and content sent from webpage servers in response to the browser HTTP requests to activate the original URL links are analyzed to determine if the response includes a redirect to a new or destination URL and associated webpage, i.e., to determine if the extracted original URLs result in redirects.

Based on the analysis at ANALYZE THE HTTP RESPONSE HEADER AND CONTENT OPERATION 311, a determination is made at ORIGINAL URL A REDIRECT CHECK OPERATION 313 as to whether a given one of the extracted original URLs redirects to a new or destination URL and associated webpage, i.e., if the given extracted original URL results in a redirect.

If it is determined that the extracted original URL does not redirect to a new or destination URL and associated webpage, i.e., a "NO" determination is made, then process flow proceeds directly to ACCESS WEBPAGE AND/OR WEBPAGE CONTENT OPERATION 323.

In one embodiment, at ACCESS WEBPAGE AND/OR WEBPAGE CONTENT OPERATION 323, the webpage associated with the extracted original URL of EXTRACT ANY INCLUDED ORIGINAL URL FROM THE MESSAGE OPERATION 307 is accessed, and/or the contents of the webpage associated with the extracted original URL are analyzed.

If at ORIGINAL URL A REDIRECT CHECK OPERATION 313 it is determined that the extracted original URL does redirect to a new or destination URL and associated webpage, i.e., a "YES" determination is made, then process flow proceeds to APPLY URL REDIRECT ANALYSIS PROCESS TO URL OPERATION 315.

At APPLY URL REDIRECT ANALYSIS PROCESS TO URL OPERATION 315, a URL redirect analysis process is initiated that includes a set of redirect processing procedures that are selectively applied to the results of ANALYZE THE HTTP RESPONSE HEADER AND CONTENT OPERATION 311 depending on the type of redirect, and/or other issues encountered, and each redirect is automatically followed.

As part of the URL redirect analysis process of APPLY URL REDIRECT ANALYSIS PROCESS TO URL OPERATION 315, each redirect associated with an extracted original URL is automatically followed.

Loops or chains of redirects are treated by recursively applying the URL redirect analysis process, i.e., the URL redirect analysis process is repeated automatically for each redirect, from the beginning, and as if the new (destination) URL is itself an original URL. As discussed below, this is indicated in FIG. 3 by NEW URL REDIRECT CHECK OPERATION 317, and path 319 back to APPLY URL REDIRECT ANALYSIS PROCESS TO URL OPERATION 315.

The URL redirect analysis process of APPLY URL REDIRECT ANALYSIS PROCESS TO URL OPERATION 315, is repeated for each new URL as often as necessary, and/or up to a defined time limit, or a defined limited number of iterations, to obtain the end destination webpage content. The implementation and application of the time limit, or a defined limited number of iterations, as discussed below, is represented by HAS TIMEOUT BEEN EXCEEDED CHECK OPERATION 321 in FIG. 3.

The URL redirect analysis process of APPLY URL REDIRECT ANALYSIS PROCESS TO URL OPERATION 315 determines the type of redirect involved, and/or if other issues are present, such as, but not limited to: whether the redirect is an interstitial webpage redirect; whether the redirect is a Meta redirect; whether the redirect is a JavaScript redirect, includes any further JavaScript to execute, and/or includes content dynamically written to the redirect webpage; whether the redirect is any form of redirect loop; whether frames, including inline frames, are involved; whether tracking bugs are present; whether DOM manipulation is present; and/or whether incorrectly used HTTP status codes are involved.

Depending on the type of redirect, and/or issue detected, the URL redirect analysis process of APPLY URL REDIRECT ANALYSIS PROCESS TO URL OPERATION 315 applies one or more redirect processing procedures specific to the type of redirect, and/or issue detected in order to follow the redirect, or redirects, through to the webpage content.

The URL redirect analysis process of APPLY URL REDIRECT ANALYSIS PROCESS TO URL OPERATION 315 determines if the redirect is an interstitial webpage type of URL-to-URL redirect.

Interstitial webpages are typically used by URL shortening services to warn users of potentially malicious content at the destination URL, or to confirm the age of a user. The mere determination that the redirect is an interstitial webpage results in the status of the URL, and the message including the URL, being transformed to a status of spam under the direction of an interstitial webpage redirect processing procedure.

In some embodiments, interstitial webpage redirects are further analyzed under the direction of the interstitial webpage redirect processing procedure and the interstitial webpage redirects are matched with a combination of regular expressions (RE) per domain, and content analysis.

In some cases, the interstitial webpage will indicate the short link has been deleted but does not provide the destination URL. In configurable cases, this is taken by the interstitial webpage redirect processing procedure as sufficient evidence to transform a status of the URL, and the message including the URL, to a status of spam.

In one embodiment, the URL redirect analysis process of APPLY URL REDIRECT ANALYSIS PROCESS TO URL OPERATION 315 determines if the redirect is a Meta redirect.

Meta redirects are a primitive redirect by use of an HTML tag. In one embodiment, Meta redirects are matched with a RE by a Meta redirect processing procedure.

In one embodiment, the URL redirect analysis process of APPLY URL REDIRECT ANALYSIS PROCESS TO URL OPERATION 315 determines if the redirect is a JavaScript (JS) redirect, includes any further JavaScript to execute, and/or includes content dynamically written to the redirect webpage.

In one embodiment, at APPLY URL REDIRECT ANALYSIS PROCESS TO URL OPERATION 315, JavaScript is identified from between "SCRIPT" tags.

In another embodiment, JavaScript is identified from "on-event attributes" and/or handlers such as, but not limited to: onBody; onLoad; onChange; onFocus; onReset; onSelect; onSubmit; onAbort; onUnload; onBlur; and/or any other event attributes as discussed herein.

In yet another embodiment, JavaScript is identified from JavaScript links, e.g., URLs that begin "javascript:".

In yet another embodiment, JavaScript is identified from external JavaScript sources or files.

If at APPLY URL REDIRECT ANALYSIS PROCESS TO URL OPERATION 315 no executable JavaScript is detected, then at EXECUTABLE JAVASCRIPT DETECTED CHECK OPERATION 316, a "NO" result is returned, and process flow proceeds to NEW URL REDIRECT CHECK OPERATION 317, as discussed below.

Figure 4:
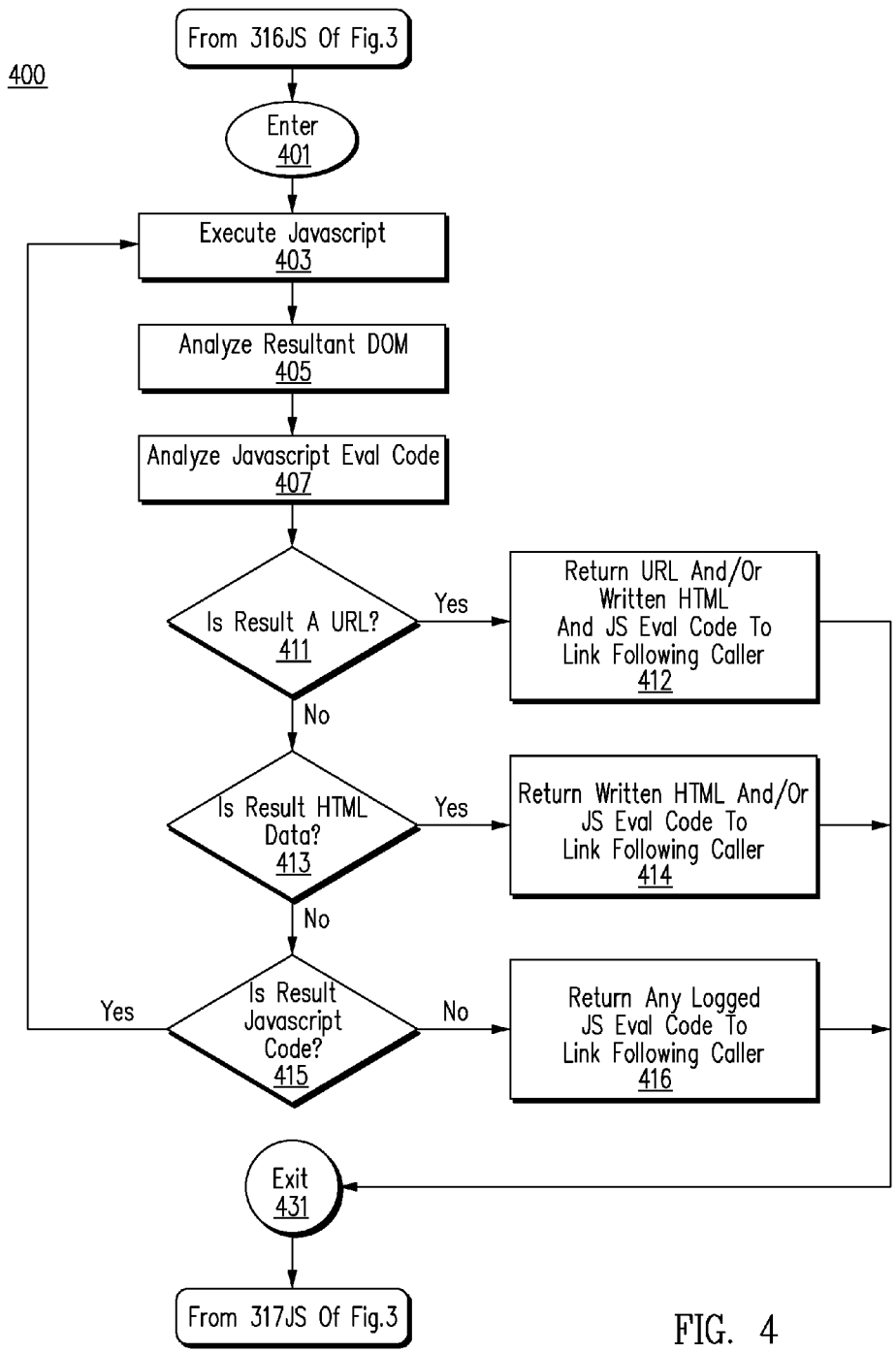
FIG. 4 is a flow chart depicting a JavaScript execution and analysis process in accordance with one embodiment.

If at APPLY URL REDIRECT ANALYSIS PROCESS TO URL OPERATION 315 executable JavaScript is detected, then at EXECUTABLE JAVASCRIPT DETECTED CHECK OPERATION 316, a "YES" result is returned, and process flow proceeds to TO ENTER OPERATION 401 OF FIG. 4 OPERATION 316JS, and onto FIG. 4.

FIG. 4 is a flow chart depicting a JavaScript execution and analysis process 400 in accordance with one embodiment.

JavaScript execution and analysis process 400 begins at ENTER OPERATION 401 and proceeds to EXECUTE JAVASCRIPT OPERATION 403.

At EXECUTE JAVASCRIPT OPERATION 403, any JavaScript identified within the webpages of APPLY URL REDIRECT ANALYSIS PROCESS TO URL OPERATION 315 (FIG. 3) is extracted and executed.

In one embodiment, at EXECUTE JAVASCRIPT OPERATION 403, JavaScript is encountered as fragments of JavaScript, or "JavaScript fragments". The order in which each JavaScript fragment is encountered within the webpage content is maintained and/or recorded at EXECUTE JAVASCRIPT OPERATION 403 to allow subsequent scripts to access and use the results of previous JavaScript fragments within the webpage.

Once JavaScript fragments have been identified, each fragment is executed in turn against a "simulated" web browser DOM. In one embodiment, the execution of JavaScript fragments makes use of a shared JavaScript execution context that includes a DOM implementation similar to that contained in a normal web browser, i.e., a web browser is "simulated", at least at the network level. Consequently, when doing an HTTP request, the User-Agent header is set appropriately in the request. JavaScript objects and associated properties to determine browser version from JavaScript code are made available. In one embodiment, this is the extent to which the emulation of a particular browser is implemented at EXECUTE JAVASCRIPT OPERATION 403, i.e., the extent to which a particular browser is "simulated". However, there is DOM support at EXECUTE JAVASCRIPT OPERATION 403, which a normal web browser would provide.

In one embodiment, the web browser simulated is a recent version of Internet Explorer™ and/or any web browser.

Once any JavaScript identified within the webpages is extracted and executed at EXECUTE JAVASCRIPT OPERATION 403, process flow proceeds to ANALYZE RESULTANT DOM OPERATION 405.

At ANALYZE RESULTANT DOM OPERATION 405, following the execution of each JavaScript fragment by the web browser being simulated at EXECUTE JAVASCRIPT OPERATION 403, the functionality within the resulting simulated DOM, e.g., the state of the DOM, is examined using introspective methods within the DOM implementation itself and any changes and/or added features are reported to JavaScript execution and analysis process 400.

From ANALYZE RESULTANT DOM OPERATION 405, process flow proceeds to ANALYZE JAVASCRIPT EVAL CODE OPERATION 407.

At ANALYZE JAVASCRIPT EVAL CODE OPERATION 407, the web browser being simulated looks for any redirect URLs that are, or include, dynamically written content.

In JavaScript, the Eval function is something of a hybrid between an expression evaluator and a statement executor. It returns the result of the last expression evaluated (all statements are expressions in JavaScript) and allows the final semicolon to be left off. The JavaScript Eval function is often used with malicious intent, such as making dynamic content changes, obfuscation, adding code, and redirects by spammers and other "bad" actors.

A common way in which the Eval function is abused is to have normal JavaScript code included in a web page. This code typically contains a huge array, or sometimes a huge string which is split into a huge array. The code then iterates over each element in the array, usually applying a basic character transformation to convert the encoded value to a character. This is then appended to a string that later is passed to the Eval function as a second fragment of JavaScript code. This can continue many times in a single page; i.e., fragments which end up calling Eval can produce further calls to eval. This allows bad actors to go to extreme lengths to "dynamically" obfuscate their code. Absent the embodiments discussed herein, these malicious procedures are largely undetectable/unstoppable and are highly "successful" methods from the spammer's perspective.

Consequently, at ANALYZE JAVASCRIPT EVAL CODE OPERATION 407, calls to the built-in JavaScript Eval function are hooked. In one embodiment, at ANALYZE JAVASCRIPT EVAL CODE OPERATION 407, Eval related code being analyzed/evaluated is then logged for later analysis by the caller and checked against blacklists of known bad code.

One of three actions is then taken depending on the result, as discussed below.

In one embodiment, once calls to the built-in JavaScript Eval function are hooked and Eval related code being analyzed/evaluated is logged for later analysis by the caller and checked against blacklists of known bad code at ANALYZE JAVASCRIPT EVAL CODE OPERATION 407, process flow proceeds to IS RESULT A URL CHECK OPERATION 411.

At IS RESULT A URL CHECK OPERATION 411, a determination is made as to whether the result of the JavaScript execution at EXECUTE JAVASCRIPT OPERATION 403 and the analysis at ANALYZE RESULTANT DOM OPERATION 405, and/or ANALYZE JAVASCRIPT EVAL CODE OPERATION 407, is a URL.

In one embodiment, if at IS RESULT A URL CHECK OPERATION 411 a determination is made that the result of the JavaScript execution at EXECUTE JAVASCRIPT OPERATION 403 and the analysis at ANALYZE RESULTANT DOM OPERATION 405, and/or ANALYZE JAVASCRIPT EVAL CODE OPERATION 407, is a URL, i.e., a "YES" result is obtained at IS RESULT A URL CHECK OPERATION 411, then process flow proceeds to RETURN URL AND/OR WRITTEN HTML AND JS EVAL CODE TO LINK FOLLOWING CALLER OPERATION 412.

At RETURN URL AND/OR WRITTEN HTML AND JS EVAL CODE TO LINK FOLLOWING CALLER OPERATION 412, the URL is returned to the URL redirect analysis process of APPLY URL REDIRECT ANALYSIS PROCESS TO URL OPERATION 315 and execution continues to allow further URLs and dynamically generated content to be extracted, as discussed below. In addition, as noted above, Eval related code being evaluated is also provided to the URL redirect analysis process of APPLY URL REDIRECT ANALYSIS PROCESS TO URL OPERATION 315 and logged for later analysis by the caller and checked against blacklists of known bad code.

Once the URL is returned to the URL redirect analysis process of APPLY URL REDIRECT ANALYSIS PROCESS TO URL OPERATION 315 and execution continues to allow further URLs and dynamically generated content to be extracted at RETURN URL AND/OR WRITTEN HTML AND JS EVAL CODE TO LINK FOLLOWING CALLER OPERATION 412, process flow proceeds to EXIT OPERATION 431 where JavaScript execution and analysis process 400 is exited, and on to operation 317JS OF FIG. 3 and FROM EXIT OPERATION 431 OF FIG. 4, and back to FIG. 3 and the process for automatically obtaining webpage content in the presence of redirects 300.

In one embodiment, if at IS RESULT A URL CHECK OPERATION 411 a determination is made that the result of the JavaScript execution at EXECUTE JAVASCRIPT OPERATION 403 and the analysis at ANALYZE RESULTANT DOM OPERATION 405, and/or ANALYZE JAVASCRIPT EVAL CODE OPERATION 407, is not a URL, i.e., a "NO" result is obtained at IS RESULT A URL CHECK OPERATION 411, then process flow proceeds to IS RESULT HTML DATA CHECK OPERATION 413.

At IS RESULT HTML DATA CHECK OPERATION 413, a determination is made as to whether the result of the JavaScript execution at EXECUTE JAVASCRIPT OPERATION 403 and the analysis at ANALYZE RESULTANT DOM OPERATION 405, and/or ANALYZE JAVASCRIPT EVAL CODE OPERATION 407, is HTML data.

If at IS RESULT HTML DATA CHECK OPERATION 413 a determination is made that the result of the JavaScript execution at EXECUTE JAVASCRIPT OPERATION 403 and the analysis at ANALYZE RESULTANT DOM OPERATION 405, and/or ANALYZE JAVASCRIPT EVAL CODE OPERATION 407, is HTML data, i.e., a "YES" result is obtained at IS RESULT HTML DATA CHECK OPERATION 413, then process flow proceeds to RETURN WRITTEN HTML AND/OR JS EVAL CODE TO LINK FOLLOWING CALLER OPERATION 414.

In one embodiment, at RETURN WRITTEN HTML AND/OR JS EVAL CODE TO LINK FOLLOWING CALLER OPERATION 414, the HTML data is returned to the URL redirect analysis process of APPLY URL REDIRECT ANALYSIS PROCESS TO URL OPERATION 315 for inclusion in a later HTML analysis of the webpage content, as discussed below. In addition, as noted above, Eval related code being analyzed/evaluated is also provided to the URL redirect analysis process of APPLY URL REDIRECT ANALYSIS PROCESS TO URL OPERATION 315 and logged for later analysis by the caller and checked against blacklists of known bad code.

Once the HTML data is returned to the URL redirect analysis process of APPLY URL REDIRECT ANALYSIS PROCESS TO URL OPERATION 315 for inclusion in a later HTML analysis of the webpage content at RETURN WRITTEN HTML AND/OR JS EVAL CODE TO LINK FOLLOWING CALLER OPERATION 414, process flow proceeds to EXIT OPERATION 431 where JavaScript execution and analysis process 400 is exited, and on to operation 317JS OF FIG. 3 and FROM EXIT OPERATION 431 OF FIG. 4, and back to FIG. 3 and the process for automatically obtaining webpage content in the presence of redirects 300.

If at IS RESULT HTML DATA CHECK OPERATION 413 a determination is made that the result of the JavaScript execution at EXECUTE JAVASCRIPT OPERATION 403 and the analysis at ANALYZE RESULTANT DOM OPERATION 405, and/or ANALYZE JAVASCRIPT EVAL CODE OPERATION 407, is not HTML data, i.e., a "NO" result is obtained at IS RESULT HTML DATA CHECK OPERATION 413, then process flow proceeds to IS RESULT JAVASCRIPT CODE CHECK OPERATION 415.

At IS RESULT JAVASCRIPT CODE CHECK OPERATION 415 a determination is made as to whether the result of the JavaScript execution at EXECUTE JAVASCRIPT OPERATION 403 and the analysis at ANALYZE RESULTANT DOM OPERATION 405, and/or ANALYZE JAVASCRIPT EVAL CODE OPERATION 407, is additional JavaScript code.

In one embodiment, if at IS RESULT JAVASCRIPT CODE CHECK OPERATION 415 a determination is made that the result of the JavaScript execution at EXECUTE JAVASCRIPT OPERATION 403 and the analysis at ANALYZE RESULTANT DOM OPERATION 405, and/or ANALYZE JAVASCRIPT EVAL CODE OPERATION 407, is not additional JavaScript code, i.e., a "NO" result is obtained at IS RESULT JAVASCRIPT CODE CHECK OPERATION 415, then process flow proceeds to RETURN ANY LOGGED JS EVAL CODE TO LINK FOLLOWING CALLER OPERATION 416.

At RETURN ANY LOGGED JS EVAL CODE TO LINK FOLLOWING CALLER OPERATION 416, any dynamically written content that is/was detected is appended to the original webpage content before the content analysis of this data occurs.

Once any dynamically written content that is/was detected is appended to the original webpage content at RETURN ANY LOGGED JS EVAL CODE TO LINK FOLLOWING CALLER OPERATION 416, process flow proceeds to EXIT OPERATION 431 where JavaScript execution and analysis process 400 is exited, and on to operation 317JS OF FIG. 3 and FROM EXIT OPERATION 431 OF FIG. 4, and back to FIG. 3 and the process for automatically obtaining webpage content in the presence of redirects 300.

If at IS RESULT JAVASCRIPT CODE CHECK OPERATION 415, a determination is made that the result of the JavaScript execution at EXECUTE JAVASCRIPT OPERATION 403 and the analysis at ANALYZE RESULTANT DOM OPERATION 405, and/or ANALYZE JAVASCRIPT EVAL CODE OPERATION 407, is additional JavaScript code, i.e., a "YES" result is obtained at IS RESULT JAVASCRIPT CODE CHECK OPERATION 415, then process flow proceeds back to EXECUTE JAVASCRIPT OPERATION 403 where the "new" additional JavaScript code is recursively processed and the additional JavaScript is itself subjected to analysis using JavaScript execution and analysis process 400 and execution continues to allow further URLs and dynamically generated content to be extracted.

In one embodiment, once JavaScript execution and analysis process 400 has completed the JavaScript execution, process flow proceeds through EXIT OPERATION 431 to operation 317JS OF FIG. 3 and FROM EXIT OPERATION 431 OF FIG. 4 and to APPLY URL REDIRECT ANALYSIS PROCESS TO URL OPERATION 315 of the process for automatically obtaining webpage content in the presence of redirects 300.

Once JavaScript execution and analysis process 400 has completed, process for automatically obtaining webpage content in the presence of redirects 300 and the URL redirect analysis process of APPLY URL REDIRECT ANALYSIS PROCESS TO URL OPERATION 315, handles the result of JavaScript execution and analysis process 400 in one of two ways.

First, any URLs that were detected either from the JavaScript execution itself or those embedded in the resultant HTML by JavaScript execution and analysis process 400 are themselves link followed by the URL redirect analysis process of APPLY URL REDIRECT ANALYSIS PROCESS TO URL OPERATION 315, as discussed below.

Secondly, any dynamically written content that was detected by JavaScript execution and analysis process 400 is appended to the original webpage content before the content analysis of this data occurs.

In one embodiment, the results of JavaScript execution and analysis process 400 are optionally cached to prevent spam runs from overrunning the JavaScript execution environment. Similarly, the execution of JavaScript segments within webpages by JavaScript execution and analysis process 400 is strictly time-limited to prevent denial of service attacks and to protect against devices such as infinite loops.

Returning to FIG. 3, in one embodiment, the URL redirect analysis process of APPLY URL REDIRECT ANALYSIS PROCESS TO URL OPERATION 315 uses dynamic limits to limit the number of redirects followed and therefore redirect loops are detected and avoided.

In one embodiment, the URL redirect analysis process of APPLY URL REDIRECT ANALYSIS PROCESS TO URL OPERATION 315 determines if frames, including inline frames, are present and, if present, a frame redirect processing procedure is employed and frames are handled by defining/identifying a frameset and specifying a URL for each frame using one or more processors, such as CPU(s) 201 of FIG. 2, associated with one or more computing systems, such as link following computing system 180 of FIGS. 1 and 2.

A maximum number of frames per webpage eligible for analysis is defined. Any frames exceeding the maximum number are not analyzed. Each frame is recursed into, following any additional redirects by the frame redirect processing procedure.

The URL redirect analysis process of APPLY URL REDIRECT ANALYSIS PROCESS TO URL OPERATION 315 determines if tracking bugs are present, and if present, the tracking bugs are retrieved by a tracking bug redirect processing procedure using one or more processors, such as CPU(s) 201 of FIG. 2, associated with one or more computing systems, such as link following computing system 180 of FIGS. 1 and 2.

Webpage/website owners use tracking bugs to track users and also frustrate automated access and/or analysis. As noted above, if a tracking bug is present but not retrieved, the webpage/web site will typically be delivered once, but subsequent requests will fail, as the IP address will be automatically blocked at DNS level by the site. This prevents access to any site hosted on the same service. In one embodiment, tracking bugs are intelligently detected using REs and content analysis, and the tracking bugs are automatically retrieved by the tracking bug redirect processing procedure under the direction of one or more processors associated with one or more computing systems.

Returning to FIG. 3, some servers return non-traditional, or incorrect, HTTP status codes, such as 404 for a deleted short link. Many current link-following, and/or security systems treat this as an error, and therefore end analysis and attempts to obtain web-page content. However, in one embodiment, in configurable cases, when such an HTTP status code is received, the attached data indicating the reason for the HTTP status code is analyzed by the URL redirect analysis process of APPLY URL REDIRECT ANALYSIS PROCESS TO URL OPERATION 315 and, if the analysis indicates a non-traditional, or incorrect, HTTP status coding, that server's use of the HTTP status code is recorded and analysis is continued in both the current instance, and future instances by the URL redirect analysis process, in both the present occurrence, and future occurrences.

In various embodiments, any combination of the redirect processing procedures discussed above, are used and/or employed by the URL redirect analysis process of APPLY URL REDIRECT ANALYSIS PROCESS TO URL OPERATION 315 and process for automatically obtaining webpage content in the presence of redirects 300.

Once a redirect analysis process is initiated and each redirect is automatically followed at APPLY URL REDIRECT ANALYSIS PROCESS TO URL OPERATION 315, process flow proceeds to NEW URL REDIRECT CHECK OPERATION 317.

At NEW URL REDIRECT CHECK OPERATION 317, based on the analysis of APPLY URL REDIRECT ANALYSIS PROCESS TO URL OPERATION 315, a determination is made as to whether a new, or destination URL redirected to by the extracted original URL, also redirects to a new, or destination URL and associated webpage, i.e., if the new URL results in a redirect.

If at NEW URL REDIRECT CHECK OPERATION 317 it is determined that a new URL does not redirect to a new, or destination URL and associated webpage, i.e., a "NO" determination is made, then the new URL is associated with the extracted original URL and process flow proceeds directly to ACCESS WEBPAGE AND/OR WEBPAGE CONTENT OPERATION 323.

At ACCESS WEBPAGE AND/OR WEBPAGE CONTENT OPERATION 323, the webpage associated with the new URL is accessed, and/or the contents of the webpage associated with the new URL are analyzed.

If at NEW URL REDIRECT CHECK OPERATION 317, it is determined that the new URL does redirect to a new, or destination URL and associated webpage, i.e., a "YES" determination is made, then the new URL is associated with the extracted original URL and process flow proceeds to HAS TIMEOUT BEEN EXCEEDED CHECK OPERATION 321.

At HAS TIMEOUT BEEN EXCEEDED CHECK OPERATION 321, a determination is made as to whether the timeout period, or timeout iteration count, has been exceeded.

The timeout period, or timeout iteration count, of HAS TIMEOUT BEEN EXCEEDED CHECK OPERATION 321 can be any period, or count, desired by the provider of the process for automatically obtaining webpage content in the presence of redirects 300, or by one or more users of the process for automatically obtaining webpage content in the presence of redirects 300 and can be adjusted as desired.

If at HAS TIMEOUT BEEN EXCEEDED CHECK OPERATION 321, it is determined that either the timeout period of time, or the maximum number of allowed iterations of NEW URL REDIRECT CHECK OPERATION 317 and path 319 back to APPLY URL REDIRECT ANALYSIS PROCESS TO URL OPERATION 315 have been executed, i.e., a "YES" result is obtained, then process flow proceeds to EXIT OPERATION 331 and process for automatically obtaining webpage content in the presence of redirects 300 is exited to await new data.

If the URL redirect analysis fails to provide access to the associated webpage, then protective action is taken such as, but not limited to: using one or more processors associated with one or more computing systems to transform the status of the URL, and the message including the URL, to a status of spam, or potential spam; and/or blocking the message including the URL, and/or the URL and all associated URLS; and/or adding the URL to a URL block list.

If at HAS TIMEOUT BEEN EXCEEDED CHECK OPERATION 321, it is determined that neither the timeout period of time, nor the maximum number of allowed iterations of NEW URL REDIRECT CHECK OPERATION 317 and path 319 back to APPLY URL REDIRECT ANALYSIS PROCESS TO URL OPERATION 315 have been executed, i.e., a "NO" result is obtained, then process flow proceeds to path 319, and back to APPLY URL REDIRECT ANALYSIS PROCESS TO URL OPERATION 315 until either a "NO" result is obtained at NEW URL REDIRECT CHECK OPERATION 317 or a "YES result is obtained at HAS TIMEOUT BEEN EXCEEDED CHECK OPERATION 321.

If at any point it is determined an original, or new URL is not a redirect and provides access to the associated webpage, i.e., a "NO" result is obtained at either ORIGINAL URL A REDIRECT CHECK OPERATION 313 or NEW URL REDIRECT CHECK OPERATION 317, then the webpage, and/or webpage content is accessed and analyzed at ACCESS WEBPAGE AND/OR WEBPAGE CONTENT OPERATION 323.

If, based on the results of the URL redirect analysis process, and/or the results of any of the redirect processing procedures, a URL is identified as being spam, or potential spam, then protective action is taken such as, but not limited to: transforming the status of the URL, and the message including the URL, to a status of spam, or potential spam; and/or blocking the message including the URL, and/or the URL and all associated URLS; and/or adding the URL to a URL block list.

If the URL redirect analysis fails to provide access to the associated webpage, one or more further analysis actions are taken such as, but not limited to: checking on the hostname of the destination URL to see if it contains spam-related words or phrases, or follows any defined pattern, or specific format, known to be used by spammers; checking if the redirect domain exists in various URL block lists; and any other further analysis as discussed herein. If the further analysis actions reveal potential spam, one or more protective actions are taken, as discussed herein. If the further analysis actions fail to yield any reliable results, no further action is taken.

Using process for automatically obtaining webpage content in the presence of redirects 300, spam messages, and spam URLs included in spam messages, can be efficiently and reliably identified even in the presence of multi-layered redirects, frames, DOM manipulation, tracking bugs, and incorrect HTTP status codes, and while avoiding pitfalls associated with redirect loops such as extremely long chains of redirects and tar-pitting.

In addition, using the process for automatically obtaining webpage content in the presence of redirects 300, multiple types of redirects, and issues in a single URL string can be addressed using the relevant redirect processing procedures specific to the types of redirects, and/or issues detected. Consequently, using the process for automatically obtaining webpage content in the presence of redirects 300, far more spam messages can be identified and stopped than is possible using currently available methods and systems.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying figures, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings herein. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the figures, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "calculating", "capturing", "classifying", "comparing", "defining", "detecting", "determining", "distributing", "encrypting", "extracting", "filtering", "generating", "implementing", "monitoring", "obtaining", "processing", "providing", "receiving", "requesting", "saving", "sending", "storing", "transferring", "transforming", "using", etc., refer to the action and processes of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, or "cloud", such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, and/or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for JavaScript execution and analysis comprising:
   extracting an original URL from a message;
   labeling the extracted URL as the original URL;
   activating the original URL to determine if the original URL results in a redirect to a new URL;
   if the original URL does not result in a redirect to a new URL, accessing a webpage associated with the original URL;
   if the original URL results in a redirect to a new URL, applying a URL redirect analysis process, the URL redi-

23 rect analysis process applying a redirect processing procedure selected based on the type of redirect associated with the original URL;
identifying JavaScript on webpages linked to by the original or any new URLs redirected to by the original URL;
extracting the identified JavaScript;
executing the identified JavaScript in a shared JavaScript execution context that includes a DOM implementation that simulates a web browser;
analyzing the state of the DOM implementation after execution of the JavaScript to identify one or more of:
any URLs being redirected to;
any additional executable JavaScript; and
any content dynamically written to the webpage; and
if the result of analyzing is additional executable JavaScript, executing and analyzing the additional JavaScript.

2. The method for JavaScript execution and analysis of claim 1, wherein the message is an e-mail.

3. The method for JavaScript execution and analysis of claim 1, wherein the message is an SMS, Instant Message (IM), or other text message or image.

4. The method for JavaScript execution and analysis of claim 1, wherein the message is a PDF file attachment, word processing document attachment, or any other document format attachment.

5. The method for JavaScript execution and analysis of claim 1, wherein the JavaScript is identified by "SCRIPT" tags.

6. The method for JavaScript execution and analysis of claim 1, wherein the JavaScript is identified by one or more event attributes.

7. The method for JavaScript execution and analysis of claim 1, wherein the JavaScript is identified by URLs that begin "javascript:".

8. A computing system implemented process for automatically obtaining webpage content in the presence of redirects comprising:
receiving a message including an original URL;
extracting the original URL from the message;
labeling the extracted URL as the original URL;
activating the original URL to determine if the original URL results in a redirect to a new URL;
if the original URL does not result in a redirect to a new URL, accessing a webpage associated with the original URL;
if the original URL results in a redirect to a new URL, applying a URL redirect analysis process, the URL redirect analysis process applying a redirect processing procedure selected based on the type of redirect associated with the original URL;
analyzing the content of webpages associated with the original URL, or any new URLs redirected to by the original URL;
if JavaScript is identified on a webpage associated with the original URL, or any new URLs, using one or more processors to implement a JavaScript execution and analysis process, the JavaScript execution and analysis process including:
extracting the identified JavaScript;
executing the identified JavaScript in a shared JavaScript execution context that includes a DOM implementation that simulates a web browser;
analyzing the state of the DOM implementation after execution of the JavaScript to identify one or more of:
any URLs being redirected to;
any additional executable JavaScript; and
any content dynamically written to the webpage;

24 if the result of the JavaScript execution and analysis process is a URL, returning the URL to the URL redirect analysis process for further processing;
if the result of the JavaScript execution and analysis process is additional executable JavaScript, processing the additional JavaScript using the JavaScript execution and analysis process; and
if the result of the JavaScript execution and analysis process is HTML data, returning the HTML data to the URL redirect analysis process for further processing.

9. The computing system implemented process for automatically obtaining webpage content in the presence of redirects of claim 8, wherein the message is an e-mail.

10. The computing system implemented process for automatically obtaining webpage content in the presence of redirects of claim 8, wherein the message is an SMS, Instant Message (IM), or other text message.

11. The computing system implemented process for automatically obtaining webpage content in the presence of redirects of claim 8, wherein the message is a PDF file or word processing document attachment.

12. The computing system implemented process for automatically obtaining webpage content in the presence of redirects of claim 8, further comprising:
if, as a result of the URL redirect analysis process, access to a webpage is obtained, associating the new URL with the original URL and accessing the associated webpage;
if, as a result of the URL redirect analysis process, it is determined the new URL also results in a redirect to an additional new URL, or includes one or more access issues, re-applying the URL redirect analysis process to all additional new URLs, or access issues, until either access to a webpage is obtained, or a timeout period, or timeout iteration count, has been exceeded;
wherein the URL redirect analysis process automatically determines a type of redirect, or access issue, associated with a URL selected from the group of redirects and access issues consisting of: an interstitial webpage redirect; a Meta redirect; the presence of frames; and an incorrectly used HTTP status code.

13. The computing system implemented process for automatically obtaining webpage content in the presence of redirects of claim 8, further comprising:
if, as a result of the URL redirect analysis process, access to a webpage is obtained, associating the new URL with the original URL and accessing the associated webpage;
if, as a result of the URL redirect analysis process, it is determined the new URL also results in a redirect to an additional new URL, or includes one or more access issues, re-applying the URL redirect analysis process to all additional new URLs, or access issues, until either access to a webpage is obtained, or a timeout period, or timeout iteration count, has been exceeded;
wherein the URL redirect analysis process includes one or more redirect processing procedures selected from the group of redirect processing procedures consisting of: an interstitial webpage redirect processing procedure; a Meta redirect processing procedure; a frames redirect processing procedure; and an incorrectly used HTTP status codes redirect processing procedure.

14. The computing system implemented process for automatically obtaining webpage content in the presence of redirects of claim 8, further comprising:
if, as a result of the URL redirect analysis process, access to a webpage is obtained, associating the new URL with the original URL and accessing the associated webpage;

if, as a result of the URL redirect analysis process, it is determined the new URL also results in a redirect to an additional new URL, or includes one or more access issues, re-applying the URL redirect analysis process to all additional new URLs, or access issues, until either access to a webpage is obtained, or a timeout period, or timeout iteration count, has been exceeded;

wherein the URL redirect analysis process includes: an interstitial webpage redirect processing procedure; a Meta redirect processing procedure; a frames redirect processing procedure; and an incorrectly used HTTP status codes redirect processing procedure.

15. The computing system implemented process for automatically obtaining webpage content in the presence of redirects of claim 8, further comprising:

if, as a result of the URL redirect analysis process, access to a webpage is obtained, associating the new URL with the original URL and accessing the associated webpage;

if, as a result of the URL redirect analysis process, it is determined the new URL also results in a redirect to an additional new URL, or includes one or more access issues, re-applying the URL redirect analysis process to all additional new URLs, or access issues, until either access to a webpage is obtained, or a timeout period, or timeout iteration count, has been exceeded;

wherein if access to a webpage is not obtained using the URL redirect analysis process before a timeout period, or timeout iteration count, has been exceeded, taking one or more further analysis actions; and if the one or more further analysis actions do not yield reliable results, taking protective action, the protective action being selected from the group of protective actions consisting of:

transforming the status of the original URL, and the message including the original URL, to a status of spam, or potential spam;

blocking the message including the original URL;

blocking the original URL and any associated new URLs; and adding the URL and any associated new URLs to a URL block list.

16. A system for automatically obtaining webpage content in the presence of redirects comprising:

a user computing system;

a link following computing system having at least one hardware processor;

a URL analysis process implemented on the link following computing system;

a URL redirect analysis process implemented on the link following computing system; and a JavaScript execution and analysis process implemented on the link following computing system;

wherein the link following computing system implements a process for automatically obtaining webpage content in the presence of redirects, the process for automatically obtaining webpage content in the presence of redirects comprising:

receiving a message directed to the user computing system, the message including an original URL;

extracting the original URL from the message;

labeling the extracted URL as the original URL;

activating the original URL to determine if the original URL results in a redirect to a new URL;

if the original URL does not result in a redirect to a new URL, accessing a webpage associated with the original URL;

if the original URL results in a redirect to a new URL, applying the URL redirect analysis process, the URL redirect analysis process applying a redirect processing procedure selected based on the type of redirect associated with the original URL;

analyzing the content of webpages associated with the original URL, or any new URLs redirected to by the original URL;

if JavaScript is identified on a webpage associated with the original URL, or any new URLs, implementing the JavaScript execution and analysis process, the JavaScript execution and analysis process including:

extracting the identified JavaScript;

executing the identified JavaScript in a shared JavaScript execution context that includes a DOM implementation that simulates a web browser;

analyzing the state of the DOM implementation after execution of the JavaScript to identify one or more of:

any URLs being redirected to;

any additional executable JavaScript; and any content dynamically written to the webpage;

if the result of the JavaScript execution and analysis process is a URL, returning the URL to the URL redirect analysis process for further processing;

if the result of the JavaScript execution and analysis process is additional executable JavaScript, processing the additional JavaScript using the JavaScript execution and analysis process; and if the result of the JavaScript execution and analysis process is HTML data, returning the HTML data to the URL redirect analysis process for further processing.

17. The system for automatically obtaining webpage content in the presence of redirects of claim 16, wherein the message is a message type selected from the group of message types consisting of:

e-mail message an SMS message; any text message;

an Instant Message (IM);

a PDF file; and a word processing document.

18. The system for automatically obtaining webpage content in the presence of redirects of claim 16, wherein the process for automatically obtaining webpage content in the presence of redirects further comprises:

transferring the extracted original URL to the URL analysis process;

the URL analysis process activating the original URL and determining if the original URL results in a redirect to a new URL;

if, as a result of the URL redirect analysis process, it is determined the new URL also results in a redirect to an additional new URL, re-applying the URL redirect analysis process to all additional new URLs until either access to a webpage is obtained, or a timeout period, or timeout iteration count, has been exceeded;

the URL redirect analysis process includes two or more redirect processing procedures selected from the group of redirect processing procedures consisting of:

an interstitial webpage redirect processing procedure;

a Meta redirect processing procedure;

a frames redirect processing procedure; and an incorrectly used HTTP status codes redirect processing procedure.

19. The system for automatically obtaining webpage content in the presence of redirects of claim 16, the process for automatically obtaining webpage content in the presence of redirects further comprises:

transferring the extracted original URL to the URL analysis process;

the URL analysis process activating the original URL and determining if the original URL results in a redirect to a new URL;

if, as a result of the URL redirect analysis process, it is determined the new URL also results in a redirect to an additional new URL, re-applying the URL redirect analysis process to all additional new URLs until either access to a webpage is obtained, or a timeout period, or timeout iteration count, has been exceeded;

the URL redirect analysis process includes:

an interstitial webpage redirect processing procedure;

a Meta redirect processing procedure;

a frames redirect processing procedure; and an incorrectly used HTTP status codes redirect processing procedure.

20. The system for automatically obtaining webpage content in the presence of redirects of claim 16, the process for automatically obtaining webpage content in the presence of redirects further comprises:

transferring the extracted original URL to the URL analysis process;

the URL analysis process activating the original URL and determining if the original URL results in a redirect to a new URL;

if, as a result of the URL redirect analysis process, it is determined the new URL also results in a redirect to an additional new URL, re-applying the URL redirect analysis process to all additional new URLs until either access to a webpage is obtained, or a timeout period, or timeout iteration count, has been exceeded;

if access to a webpage is not obtained using the URL redirect analysis process before a timeout period, or timeout iteration count, has been exceeded, taking one or more further analysis actions; and if the one or more further analysis actions do not yield reliable results, taking protective action, the protective action being selected from the group of protective actions consisting of:

transforming the status of the original URL, and the message including the original URL, to a status of spam, or potential spam;

blocking the message including the original URL;

blocking the original URL and any associated new URLs; and adding the URL and any associated new URLs to a URL block list.

* * * * *